3,423,064
DISPENSER VALVE MEANS
Philip W. Harland, Perkasie, and Siegfried H. A. Schmaus, Philadelphia, Pa., assignors to Ametek, Inc., New York, N.Y., a corporation of Delaware
Filed Mar. 4, 1966, Ser. No. 531,866
U.S. Cl. 251—231          9 Claims
Int. Cl. F16k 31/44

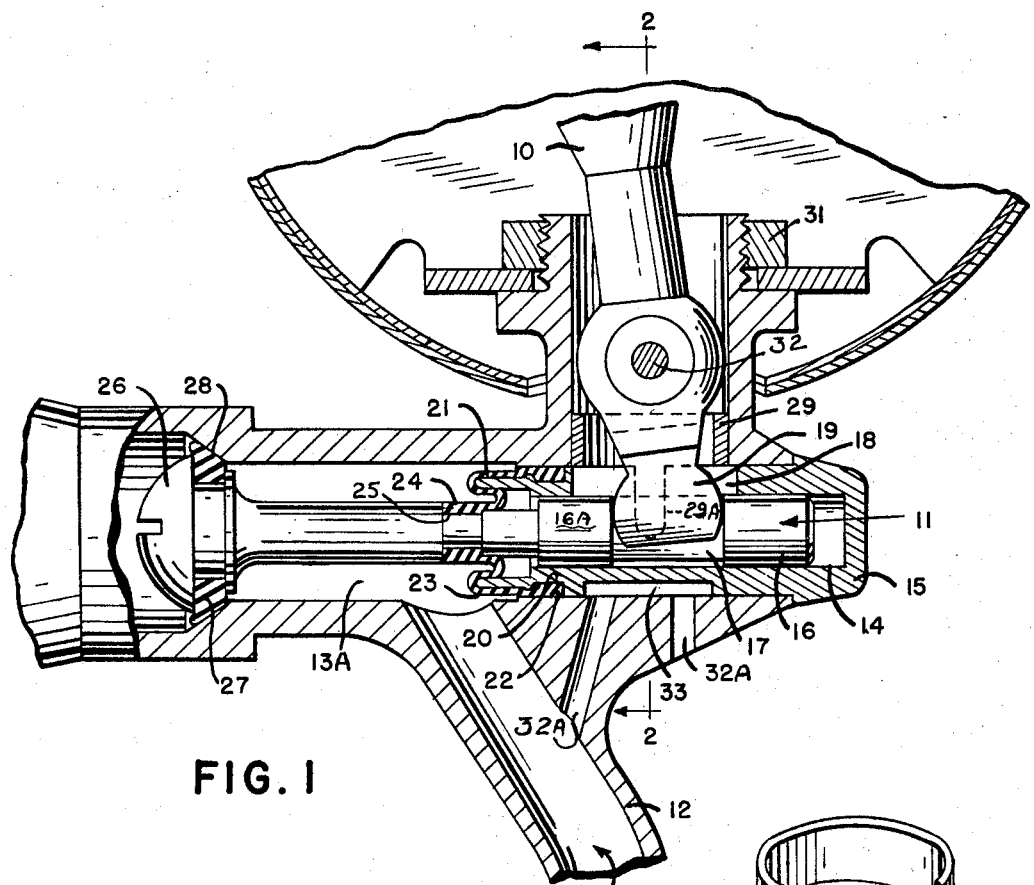
FIG. 1
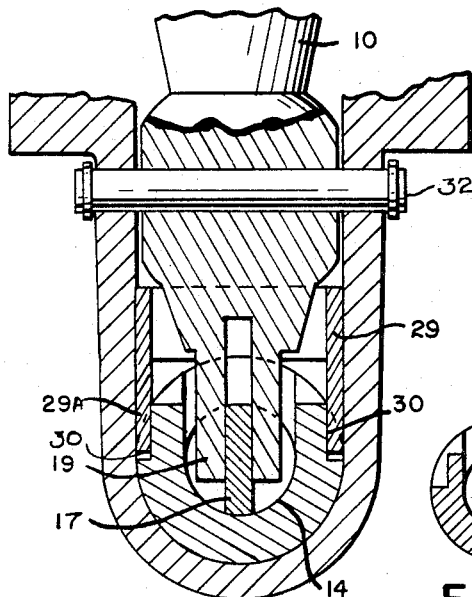
FIG. 2
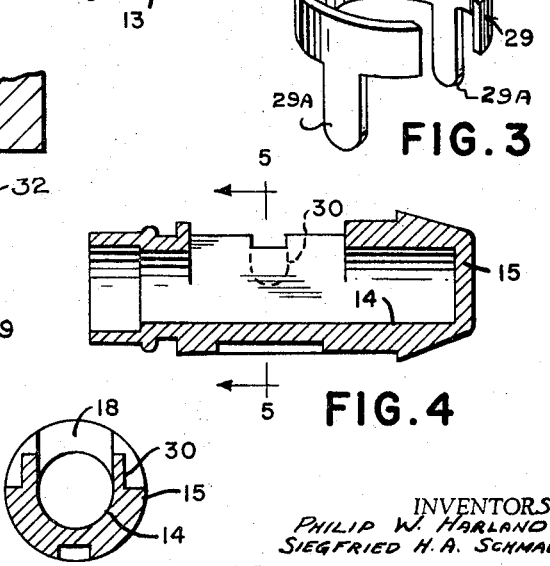
FIG. 3
FIG. 4
FIG. 5
INVENTORS
PHILIP W. HARLAND
SIEGFRIED H. A. SCHMAUS
BY
Smythe & Moore
ATTORNEYS

United States Patent Office 3,423,064
Patented Jan. 21, 1969

ABSTRACT OF THE DISCLOSURE

A spigot having a valve for controlling the dispensing of liquids, such as beer, wherein the valve is slidably arranged in a tubular guide having open and closed ends. A flexible seal is mounted on the open end to seal the valve parts from liquid, and the closed end of the guide prevents access to and unauthorized operation of the valve.

---

This invention relates to valves or spigots for controlling the dispensing of liquids or beverages, such as beer and the like, wherein sticking of the valve may be encountered.

Problems arise in dispensing beer and other similar beverages that form a foaming head thereon and are of such character that sticky deposits may be left on the parts. When the working parts are not protected, the parts may stick and will require frequent cleaning. Also, for health reasons, the parts must be kept clean. This has been a difficult problem to solve in prior arrangements. Further, in dispensing devices involving counters or measuring, the parts must be arranged so that unauthorized operation or pouring cannot be accomplished.

The principal object of this invention is to provide valve or spigot arrangements which are particularly useful for controlling the dispensing of beer and other effervescent beverages wherein the parts will not become coated with sticky substances during use.

Another object of the invention is to provide a valve arrangement which cannot be unauthorizedly actuated.

In one aspect of the invention, the beer dispensing apparatus may comprise a spigot having a valve which, when opened, causes the flow of beer or the like through the spigot to a receptacle. The valve or stem may be reciprocable and may be opened by an operator connected thereto, such acting against the force of a spring by energizing a rotary or linear solenoid, torque stall motor, or the like. Energization of the solenoid or valve operator may be effected by the movement of a handle in one direction or to a first position for the main quantity.

The valve arrangement is one wherein a flexible or slack seal is connected to the valve stem and also to the valve body means so as to prevent the beer or fluid from reaching the slidable parts which might result in sticking.

The valve means or stem is held in a guide which is inserted into a passage in the valve body. The end of the guide is closed so as to prevent access to the stem. A lock or collar may be inserted into slots in the carrier or guide so as to lock it in place.

Other objects, advantages and features of the invention will become apparent from the following specification and accompanying drawing which are merely exemplary.

In the drawing:

FIG. 1 is a fragmentary sectional view of one form of the valve assembly;

FIG. 2 is a fragmentary enlarged view taken along the line 2—2 of FIG. 1;

FIG. 3 is a perspective view of the lock means;

FIG. 4 is an enlarged view of the valve stem carrier; and

FIG. 5 is a sectional view taken along the line 5—5 of FIG. 4.

The invention may be used for various purposes but will be described in conjunction with a beer dispensing arrangement such as described in detail in copending application Ser. No. 504,699, filed Oct. 24, 1965, now Patent No. 3,355,068.

Referring to FIG. 1, the operator 10 is connected to valve means or the stem arrangement shown generally at 11. The spigot 13 is at the end of the opening or liquid passage 13A. The valve stem may comprise an enlarged portion or guide area 16, 16A which has a close sliding fit with guide portion 14 of the stem carrying sleeve or carrier 15. The stem carrying sleeve 15 preferably is made of polytetrafluoroethylene which has non-sticking characteristics. Alternately, the parts may have a coating or film thereof therebetween. One form of polytetrafluoroethylene is that sold under the trademark "Teflon" by E. I. du Pont de Nemours.

The enlarged portion 16 has a slotted or stepped area 17 for receiving the bifurcated portion 19 of the valve operating means 10 in stepped area 17. Stem carrying means 15 preferably has a groove 20 therein for receiving the end of a seal element 21. The preferred seal element may comprise a lip 22 which has an O-ring-like shape when in uncompressed condition. The portion 23 of the seal is a slack or flexible portion terminating in a ridge member 24. Ridge member 24 fits into the groove 25 of valve stem 11. The valve may include a threaded aperture (not shown) for receiving a valve button 26 which compresses or carries valve gasket 27 cooperating with the valve seat 28. The seal element also could be an O-ring type arranged to provide a tight sliding seal.

In order to assemble the unit, valve carrier 15 has the element 21 placed thereon. The valve stem 11 then is placed into the valve carrier 15, ridge member 24 being snapped into groove 25. The entire element then can be slipped into the body to the left (FIG. 1), the button 26 not being thereon at this time. It may be necessary to provide lubrication in order to assemble the parts because they should have relatively tight fits.

Lock or key 29 (FIGS. 1 and 3) has tongues 29A which are dropped into the two cut-outs 30 (FIG. 2) so as to lock the carrier 15 in position so that it cannot be axially or rotatably moved. The lock is held in place by valve operator 10, held by nut 31, which is put into position within the valve body proper. The pin 32 also will assist in holding the parts in position. When operator 10 is in place, it traps the valve stem portion 17 so that it cannot be turned nor can it be slid out of the valve body. Valve button 26 with its valve element 27 is then assembled so that a unitary structure is provided. Apertures 32A and slot 33 can be used to provide a passage for air to the valve or spigot passage so as to prevent air lock and yet not to be open so that the valve can be surreptitiously operated. The apertures and slot can be omitted.

By use of this type of valve, the liquid or beer cannot enter the working parts of the valve stem and valve carrier, and this will prevent sticking or deposits being built up therein. Also, the structure provides an arrangement whereby the valve cannot be operated except by the electromechanical operating means and such will prevent liquid from being surreptitiously taken from the dispenser.

It should be apparent that variations in details of construction can be made without departing from the spirit of the invention except as defined in the appended claims.

What is claimed is:

1. In a spigot for liquid, the combination including a valve body means having an inlet and an outlet and a fluid passage therebetween, a valve seat for controlling flow of liquid through said passage, reciprocable valve means extending into said passage and cooperating with said seat, said valve means having guide surface means thereon, tubular guide means in said valve body means having one end open and the other end closed, said guide means slidingly receiving said valve means, and seal means connected to said valve means and with said valve body means at locations between the open end of said guide means and the portion of said passage through which liquid flows so as to prevent liquid from reaching said guide means from said passage during operation, and the closed end of said guide means preventing access to and unauthorized operation of said valve.

2. A spigot according to claim 1 wherein the seal means is a flexible means.

3. A spigot according to claim 2 wherein the guide means is located in a carrier held in a passage in said valve body means.

4. A spigot according to claim 3 wherein said carrier is closed off at the outer end thereof.

5. A spigot according to claim 3 wherein said carrier has an aperture therethrough for receiving the end of an operator, and means for connecting said operator to said valve means for reciprocating the same.

6. A spigot according to claim 5 wherein said valve body means has an aperture through which said operator passes, and a locking collar means insertable through said aperture for locking said carrier in place and thereby preventing removal from the valve body means.

7. A spigot according to claim 5 wherein the valve means and the end of the operator have a connection including a reduced section and bifurcated portion to engage said reduced section.

8. A spigot according to claim 3 wherein the guide means and carrier have polytetrafluoroethylene therebetween.

9. A spigot according to claim 3 wherein the flexible seal means has an annular ring at each end with a flexible portion therebetween.

References Cited

UNITED STATES PATENTS

| 916,629 | 3/1909 | Throop | 251—87 |
| 1,978,831 | 10/1934 | Zetterstrom | 251—237 |
| 2,895,708 | 7/1959 | Palumbo | 251—335 X |
| 2,950,081 | 8/1960 | Steinbuch et al. | 251—368 X |

FOREIGN PATENTS 1,136,174  9/1962  Germany.

WILLIAM F. O'DEA, *Primary Examiner.*

D. MATTHEWS, *Assistant Examiner.*

U.S. Cl. X.R.

251—87, 214 324; 137—322